United States Patent [19]

Morita et al.

[11] Patent Number: 4,739,962
[45] Date of Patent: Apr. 26, 1988

[54] VIBRATION ISOLATOR

[75] Inventors: Isamu Morita; Katsuyoshi Arai; Tetsuya Koike, all of Saitama, Japan

[73] Assignee: Honda Giken Kogyo Kabushiki Kaisha, Tokyo, Japan

[21] Appl. No.: 40,685

[22] Filed: Apr. 22, 1987

Related U.S. Application Data

[63] Continuation of Ser. No. 703,155, Feb. 19, 1985, abandoned.

[30] Foreign Application Priority Data

Feb. 21, 1984 [JP] Japan .................................. 59-31286

[51] Int. Cl.$^4$ ............................................. F16F 9/10
[52] U.S. Cl. .................................... 248/562; 267/140.1
[58] Field of Search ............... 248/562, 615, 632, 634, 248/635, 636, 621, 631, 659; 267/8 R, 140.1, 140.3, 141, 141.1, 141.2, 35, 113, 118; 188/285, 299; 137/858; 138/45

[56] References Cited

U.S. PATENT DOCUMENTS

| | | | |
|---|---|---|---|
| 1,739,838 | 12/1929 | Johnson | 137/858 |
| 3,805,828 | 4/1974 | Panagrossi | 137/858 |
| 4,416,445 | 11/1983 | Coad | 248/562 |
| 4,418,897 | 12/1983 | Hartel | 248/562 |
| 4,483,370 | 11/1984 | Talasz | 138/45 |
| 4,483,521 | 11/1984 | Kakimoto | 248/562 |

FOREIGN PATENT DOCUMENTS

| | | | |
|---|---|---|---|
| 3013763 | 10/1981 | Fed. Rep. of Germany | 138/45 |
| 3245653 | 6/1984 | Fed. Rep. of Germany | 267/140.1 |
| 10382 | 3/1971 | Japan | 138/45 |
| 153133 | 11/1981 | Japan | 267/140.1 |
| 72741 | 4/1983 | Japan | 267/140.1 |
| 1404857 | 7/1975 | United Kingdom | 138/45 |

Primary Examiner—Ramon O. Ramirez
Assistant Examiner—Robert A. Olson
Attorney, Agent, or Firm—Armstrong, Nikaido, Marmelstein & Kubovcik

[57] ABSTRACT

A vibration isolator supports a vibrating body vibrating in a wide frequency range while isolating produced vibrations in the entire frequency range. The vibration isolator includes a first attachment member adapted to be connected to the vibrating body, a second attachment member adapted to be connected to the structural body, and an elastically deformable resilient member fixed to and interconnecting the first and second attachment members, the resilient member being elastically deformable in response to relative movement of the first attachment member with respect to the second attachment member. The vibration isolator has a first chamber defined at least partly by the resilient member and having a volume variable dependent on elastic deformation of the resilient member, and a second chamber communicating with the first chamber through a communication structure and having a volume variable dependent on variation of the volume of the first chamber, the first and second chambers being filled with a liquid. The communication structure includes a passage having an internal volume large enough to allow substantial resonance of a flow of the liquid in the passage to be induced by vibrations of the vibrating body based on both the mass of the liquid flowing in the passage and the difference between pressures in the first and second chambers.

16 Claims, 4 Drawing Sheets

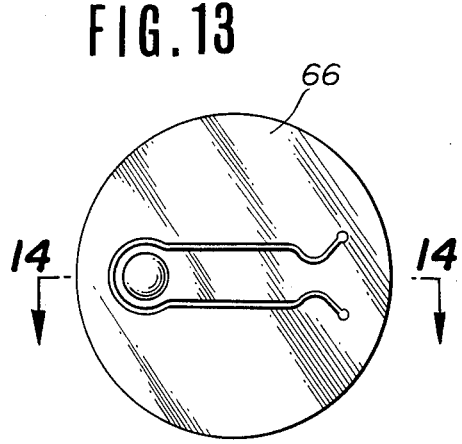
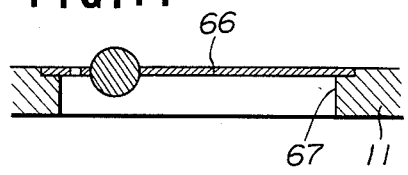
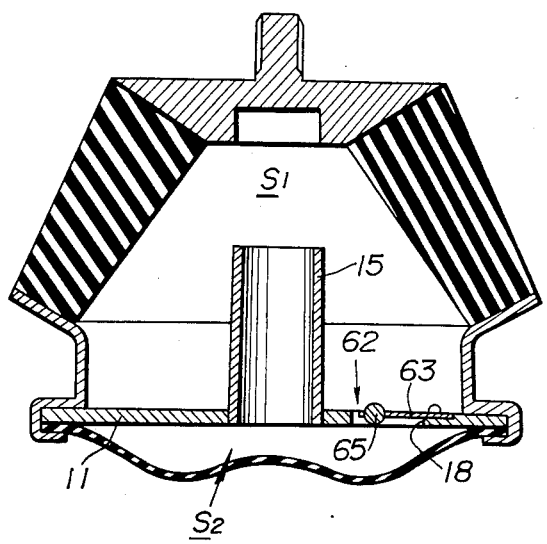
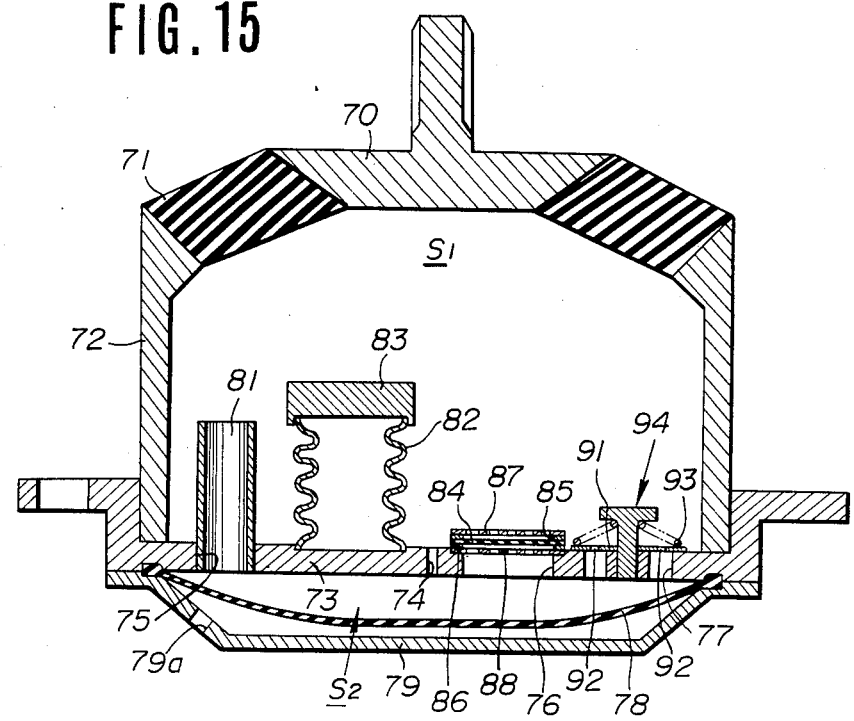

VIBRATION ISOLATOR

This application is a continuation of application Ser. No. 703,155, filed Feb. 19, 1985, now abandoned.

BACKGROUND OF THE INVENTION

1. Field of the Invention

The present invention relates to a vibration isolator for mounting a vibrating body on a structural body.

2. Description of the Prior Art

For mounting vibrating bodies such as engines on structural bodies such as automobile chassis, there have heretofore been widely employed vibration isolators each composed of two attachment members joined respectively to the vibrating body and the structural member and a resilient block of rubber fixed to the attachment members to couple them. In the conventional vibration isolator of the above type, the resiliency of the rubber block serves as a spring for absorbing shocks and the internal friction of the rubber block due to yielding thereof serves as a damper for dissipating the energy of vibration. The vibration isolator is required to be designed with a view to both reducing vibrations transmitted to the structural body and supporting the vibrating body securely on the structural body, dependent on the static load to be borne and the intensity and the frequency of vibrations of the vibrating body.

It is relatively easy to design a vibration isolator if the frequency of vibrations of the vibrating body is constant or in a narrow range. However, in the event that the vibration frequency varies normally in a wide range, it has been difficult to design a vibration isolator capable of sufficiently isolating all vibrations in the wide frequency range. For example, a four-cylinder four-stroke automotive engine normally operating in a range of from about 600 r.p.m. to 6,000 r.p.m. vibrates in a frequency range of from about 20 Hz to 200 Hz. Any vibration isolators conventionally available for mounting such an automotive engine have proven satisfactory in isolating engine vibrations merely in a portion of the above frequency range.

SUMMARY OF THE INVENTION

The present invention has been accomplished in an effort to solve the foregoing prior problem.

It is an object of the present invention to provide a vibration isolator capable of supporting a vibrating body vibrating in a wide frequency range while isolating produced vibrations in the entire frequency range.

Another object of the present invention is to provide a vibration isolator capable of appropriately supporting a vibrating body, the amplitude of the vibration of which varies dependent on the vibration frequency.

Still another object of the present invention is to provide a vibration isolator suitable for use in mounting an automotive engine, for example, on an automotive chassis.

According to the present invention, a vibration isolator for mounting a vibrating body on a structural body includes a first attachment member adapted to be connected to the vibrating body, a second attachment adapted to be connected to the structural body, and an elastically deformable resilient member fixed to and interconnecting the first and second attachment members, the resilient member being elastically deformable in response to relative movement of the first attachment member with respect to the second attachment member. The vibration isolator has a first chamber defined at least partly by the resilient member and having a volume variable dependent on elastic deformation of the resilient member, and a second chamber communicating with the first chamber through a communication structure and having a volume variable dependent on variation of the volume of the first chambe, the first and second chambers being filled with a liquid. The communication structure includes a passage means having an internal volume large enough to allow substantial resonance of a flow of the liquid in the passage means to be induced by vibrations of the vibrating body based on both the mass of the liquid flowing in the passage means and the difference between pressures in the first and second chambers.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 12 is a vertical cross-sectional view of a vibration isolator according to a fourth embodiment of the present invention;

FIG. 13 is a plan view of an alteration of a reed valve in the vibration isolator of FIG. 12;

FIG. 14 is a cross-sectional view taken along line 14—14 of FIG. 13; and

FIG. 15 is a vertical cross-sectional view of a vibration isolator according to a fifth embodiment of the present invention.

DESCRIPTION OF THE PREFERRED EMBODIMENTS

Identical or corresponding parts are denoted by identical or corresponding referene characters throughout the views.

Figure 1:
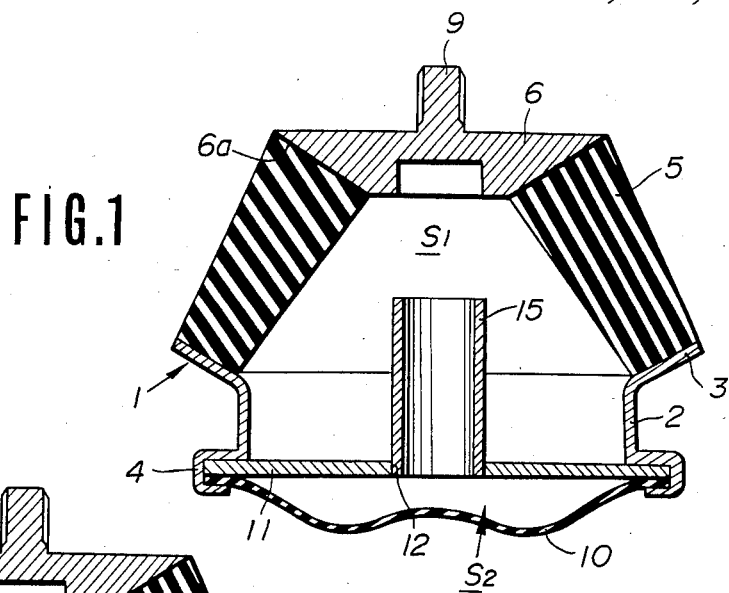
FIG. 1 is a vertical cross-sectional view of a vibration isolator according to a first embodiment of the present invention.

FIG. 1 shows in vertical cross section a vibration isolator according to a first embodiment of the present invention. The vibration isolator includes a base member 1 having a tubular portion 2 including an upper tapered female tubular portion 3 and a lower annular grip portion 4 of a channel-shaped cross section. An umbrella-shaped resilient member 5 of rubber having a thick wall is joined by curing to an inner peripheral surface of the tapered female tubular portion 3. An attachment member 6 comprising a thick circular plate has a tapered male surface 6a along an outer periphery thereof, the resilient member 5 being also joined by curing to the tapered male surface 6a. A partition or support plate 11 and a diaphragm 10 composed of a thin rubber sheet therebelow are circumferentially disposed in and gripped by the annular grip 4.

For mounting a vibrating body on a structural body, it is the general practice to join the attachment member 6 and the base member 1 respectively to the vibrating body and the structural body. As can readily be understood, however, the attachment member 6 may be coupled to the structural body while the base member 1 may be coupled to the vibrating body. A first chamber $S_1$ is defined above the partition 11 primarily by the resilient member 5, and a second chamber $S_2$ is defined beneath the partition 11 by the partition 11 and the diaphragm 10.

The partition 11 has a central circular hole 12 of a large diameter. A hollow cylinder 15 has a lower end fixedly mounted in the circular hole 12, the interior of the cylinder 15 serving as a passage through which the first and second chambers $S_1$, $S_2$ communicate with each other. The cylinder 15 is made of a rigid material such as metal, and should preferably be of an inside diameter of more than 10 mm and a length which is 1.5 times the inside diameter thereof. The first and second chambers $S_1$, $S_2$ communicating with each other via the cylinder 15 are filled with a liquid.

The functions of the vibration isolator will be described with reference to an application in which the vibration isolator is employed to mount an engine on an automative chassis. The base member 1 is fixed to the chassis and the engine is fastened to an attachment screw 9 projecting from the attachment member 6. In operation, when the resilient member 5 is elastically deformed as the engine vibrates, the volume of the first chamber $S_1$ is varied to force the liquid to reciprocate between the first and second chambers $S_1$, $S_2$ through the cylinder 15. The difference between pressures in the first and second chambers $S_1$, $S_2$ is equal to the sum of (I) a damping pressure difference dependent on an energy loss due to the flow of the liquid, and (II) a resonating pressure difference corresponding to variations in the speed of flow of the liquid in the cylinder 15, i.e., to accelerate and decelerate the liquid in the cylinder 15.

The first chamber $S_1$ is allowed to change its volume by the elastic deformation of the resilient member 5, whereas the second member $S_2$ is allowed to change its volume by the elastic deformation of the diaphragm 10. Therefore, the first and second chambers $S_1$, $S_2$ serve as volume springs per se. The mass of the liquid in the cylinder 15 and the first and second chambers $S_1$, $S_2$ jointly constitute a resonatable vibration system.

Inasmuch as the inside diameter of the cylinder 15 is in excess of 10 mm, the resistance to the liquid flow through the cylinder 15 is relatively small, and the damping pressure difference is attributable substantially to the energy loss produced when the liquid flows into the opening in one end of the cylinder 15 and the energy loss produced when the liquid flows out of the opening in the other end of the cylinder 15. The inner volume of the cylinder 15 is large enough to allow substantial resonance of the flow in the cylinder 15 to be induced by engine vibrations based on the mass of the liquid in the cylinder 15 and the resonating pressure difference. The damping pressure difference should not be excessively greater than the resonating pressure difference.

The difference between the phase of engine vibrations and the phase of resonance of the liquid in the cylinder 15 is variable dependent on the frequency of the engine vibrations. In the embodiment of FIG. 1, periodic variations of the force imposed by the resilient member 5 on the base member 1 in a range in which the engine rotates at a relatively low speed are in opposite phase with periodic variations of the pressure in the first chamber $S_1$ which acts on the base member 1. Therefore, these periodic variations cancel out each other to reduce vibrations transmitted to the automative chassis. This results in an effect equivalent to a reduced dynamic spring constant of the vibration isolator at low speeds of rotation of the engine. An experiment was conducted in which a four-cylinder four-stroke engine was mounted by a vibration isolator having a cylinder 15 of an inside diameter of 10 mm. It was found that transmitted vibrations were greatly reduced at a vibration frequency of 20 Hz while the engine was idling at 600 r.p.m.

The greater the diameter of the passage in the cylinder 15, the higher the resonance frequency of the liquid flow through the cylinder. The longer the passage in the cylinder 15, the higher the resonating pressure difference.

There is a limitation on the height available of the interior of the vibration isolator. Therefore, if it is desired to increase the length of the liquid flow passage to meet vibration characteristics of the vibrating body to be supported, then bent passages as shown in FIGS. 2, 3, and 4 should be employed.

Figure 2:
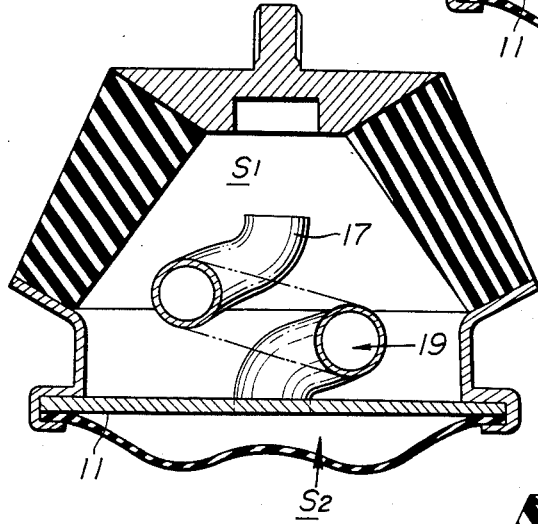
FIG. 2 is a vertical cross-sectional view of a first modification of the vibration isolator shown in FIG. 1.

FIG. 2 shows a first modification of the vibration isolator of the first embodiment. The modification includes an elongate cylinder 17 formed as a spiral in conformity with the internal configuration of the first chamber $S_1$, the cylinder 17 being fixedly disposed in an opening defined in the support plate 11. The spiral cylinder 17 defines an elongate passage 19 therein.

Figure 3:
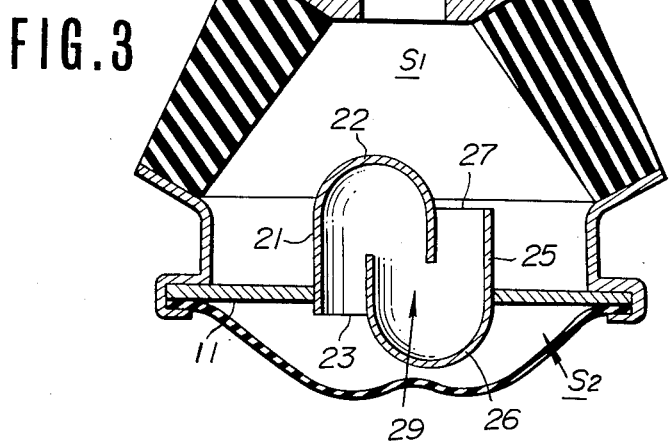
FIG. 3 is a vertical cross-sectional view of a second modification of the vibration isolator shown in FIG. 1.

FIG. 3 illustrates a second modification in which two bottomed tubular bodies 21, 25 closed at ends thereof by hemispherical members 22, 26 are staggered by an interval equal to the radius of each tubular body. The tubular bodies 21, 25 are oppositely oriented with openings 23, 27 in the tubular bodies 21, 25 opening away from each other. The tubular bodies 21, 25 thus combined are fixedly mounted in the opening in the support plate 11. The combined tubular bodies 21, 25 provide an elongate passage 29 therein.

Figure 4:
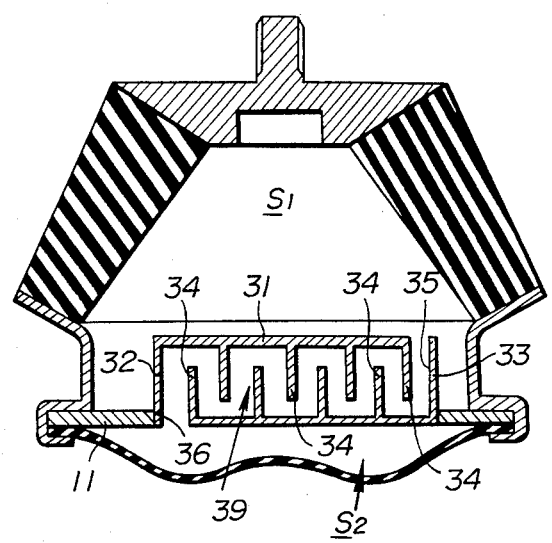
FIG. 4 is a vertical cross-sectional view of a third modification of the vibration isolator shown in FIG. 1.

FIG. 4 is illustrative of a third modification in which a cylinder 31 with opposite ends closed by covers 32, 33 is placed horizontally on the support plate 11. The cylinder 31 has therein a number of partition members 34 projecting alternately upwardly and downwardly. The cylinder 31 also has openings 35, 36 defined in outer peripheries thereof adjacent to the opposite ends, the openings 35, 36 opening into the first and second chambers $S_1$, $S_2$, respectively. The partitioned cylinder 31 has an elongate passage 39 defined therethrough.

The bent passages shown in FIGS. 2, 3, and 4 ensure sufficiently long passages in the vibration isolators having limited heights. With these modified arrangements, the resonating pressure difference is greater since the mass of the liquid in the passages 19, 29, 39 is relatively large.

Figure 5:
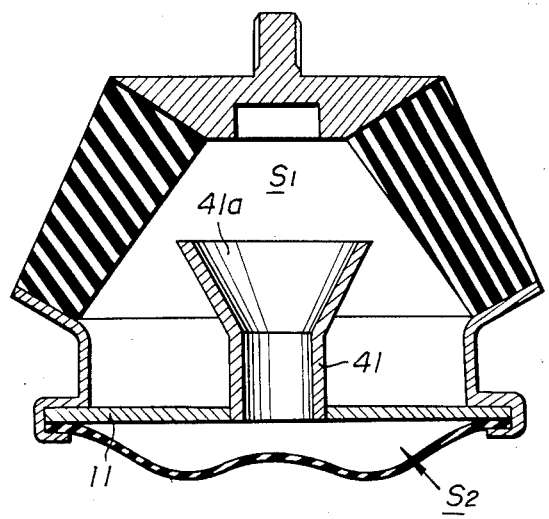
FIG. 5 is a vertical cross-sectional view of a fourth modification of the vibration isolator shown in FIG. 1.

In some applications, it is preferable to reduce the damping pressure difference to meet vibrating characteristics of vibrating bodies. FIG. 5 shows a fourth modification of the first embodiment, which is constructed to provide such reduced damping pressure differences. As illustrated in FIG. 5, a cylinder 41 has an upper tapered half portion 41a flaring upwardly for reducing a loss of energy of the liquid flow from the first chamber $S_1$ into the cylinder 41. With this construction, the vibration isolator has a reduced damping capability and provides an increased resonating ability of the liquid flow.

Figure 6:
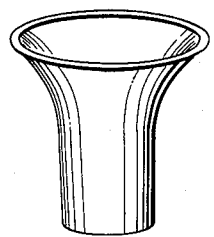
FIG. 6(a), 6(b), and 6(c) are perspective views of alterations of a cylinder in the modified vibration isolator shown in FIG. 5.
Figure 6:
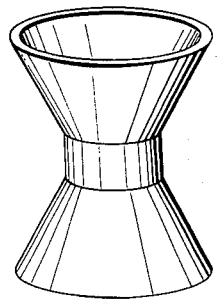
Figure 6:
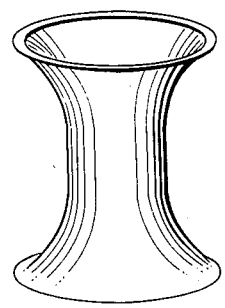

The cylinder 41 may comprise a trumpet-shaped cylinder with its upper half portion flaring upwardly along a smooth curve as shown in FIG. 6(a).

The cylinder 41 may also be composed of a cylinder having upper and lower tapered portions as illustrated in FIG. 6(b).

Alternatively, the cylinder 41 may be a cylinder with upper and lower portions each smoothly flaring upwardly and downwardly as shown in FIG. 6(c).

The engines sometimes produce violent shocks as well as vibrations. Therefore, it is preferable in some cases to provide vibration isolators capable of bearing such violent shocks. In such cases, it is preferable one case to present the resilient body from being elastically deformed to minimize swinging movements of the engine when the engine produces a shock, while in another case it is preferable to increase the elastic deformation of the resilient member to reduce acceleration of the chassis at the time a shock is produced by the engine. Second and third embodiments of the present invention which are designed to meet the above demands, respectively, will now be described.

Figure 7:
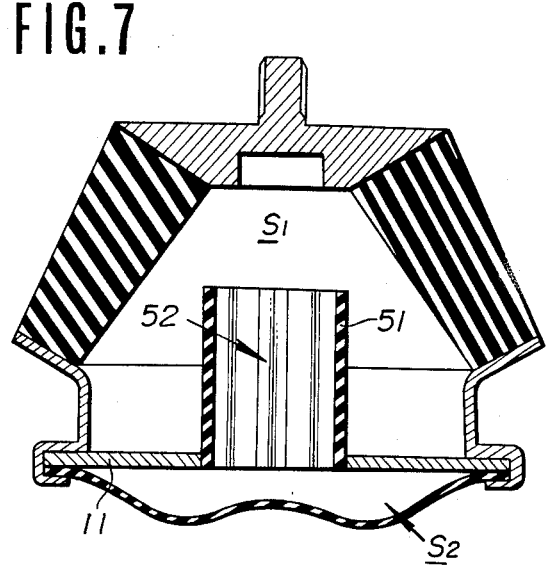
FIG. 7 is a vertical cross-sectional view of a vibration isolator according to a second embodiment of the present invention.
Figure 8A:
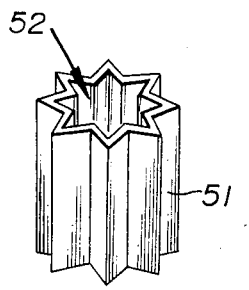
FIG. 8(a) is a perspective view of a rubber tube in the vibration isolator of FIG. 7.
Figure 8B:
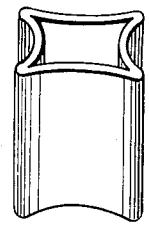
FIG. 8(b) and 8(c) are perspective views of alterations of the rubber tube of FIG. 8(a)
Figure 8C:
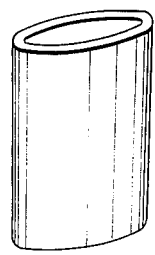

FIG. 7 shows a vibration isolator according to a second embodiment of the invention. The vibration isolator includes a rubber tube 51 (FIG. 8(a)) of a star-shaped cross section, in place of the cylinder of rigid material. When a large pressure is applied to the liquid in the first chamber $S_1$, the rubber tube 51 is elastically deformed inwardly due to a large pressure difference between the pressure in the first chamber $S_1$ and the rubber tube 51. The cross-sectional area of a passage 52 defined in the rubber tube 51 is then reduced to dampen the liquid as it moves through the rubber tube 51. Therefore, shaking engine movements and swinging engine movements which are induced when a shock is applied as by shifting transmission gears can be reduced. The rubber tube 51 may be of a substantially square cross section as shown in FIG. 8(b) or of a substantially oval-shaped cross section as illustrated in FIG. 8(c) to achieve the same advantage.

Figure 9:
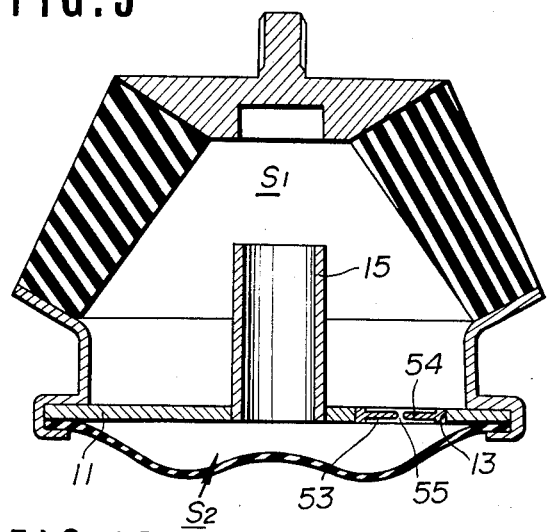
FIG. 9 is a vertical cross-sectional view of a vibration isolator according to a third embodiment of the present invention.
Figure 10:
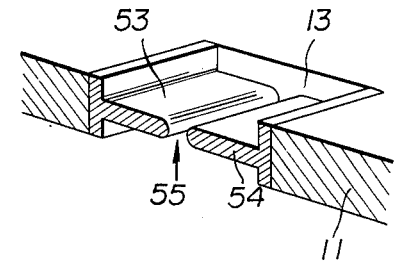
FIG. 10 is a perspective view of a spring valve in the vibration isolator illustrated in FIG. 9.
Figure 11:
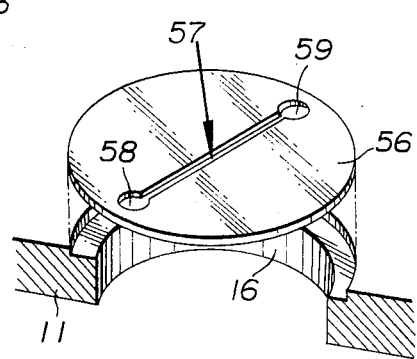
FIG. 11 is a perspective view of an alteration of the spring valve of FIG. 10.

FIG. 9 shows a vibration isolator according to a third embodiment of the invention. The vibration isolator of FIG. 9 differs from that of the first embodiment in that the partition 11 has a spring valve composed of a pair of leaf springs 53, 54, as better shown in FIG. 10. More specifically, the partition 11 has a rectangular hole 13 in which the leaf springs 53, 54 each in the form of a thin rectangular metal plate are fixed to opposite sides of the rectangular hole 13, with a slit 55 defined between the leaf springs 53, 54. In operation, when there is a large difference between liquid pressures in the first and second chambers $S_1$, $S_2$, the free ends of the leaf springs 53, 54 are displaced into the lower-pressure chamber to increase the width of the slit 55, thereby providing a communication passage of an increased cross-sectional area to reduce the liquid pressure in the higher-pressure chamber. Therefore, any excessive liquid pressure buildup can be prevented to improve an ability of the vibration isolator to isolate vibrations from the chassis. As shown in FIG. 11, a spring valve may comprise a disk-shaped leaf spring 56 having a diametrical slit 57 with circular holes 58, 59 defined at opposite ends thereof, and the spring valve may be fixedly positioned over an opening 16 defined in the partition 11.

At times, the engine produces vibrations coinciding with harmonics of natural vibrations of the engine per se. When such vibrations are produced, much greater vibrations are transmitted to the chassis. A vibration isolator having a mechanism for reducing such vibrations according to a fourth embodiment will be described. The vibration isolator of the fourth embodiment is different from that of the first embodiment in that the vibration isolator has a weighted reed valve as shown in FIG. 12.

The partition 11 has an oblong hole 18, and a reed valve 63 complementary in shape to the oblong hole 18 is mounted on the partition 11 to substantially close the oblong hole 18, with a narrow clearance 62 left between the edge of the oblong hole 18 and the reed valve 63. A weight 65 is fixed to a free end of the reed valve 63. The reed valve 63 with the weight 65 has a natural frequency of vibrations which coincides substantially with the harmonics of the natural vibrations of the engine. When the engine vibrates at this frequency, the reed valve resonates to bring the first and second chambers into mutual communication to reduce vibrations transmitted to the chassis. The resonance frequency of the reed valve should not coincide with the resonance frequency of the liquid flow through the cylinder 15 since if they coincided with each other, the reed valve and the cylinder would coact to impair their functions. It is preferable in certain cases to provide a plurality of reed valves having different resonance frequencies. As shown in FIGS. 13 and 14, a single plate 66 may have both an oblong hole and a reed valve, and may be attached to the partition 11 over a circular hole 67.

The other structural details than the communication structure in the first through fourth modifications of the first embodiment and in the second through fourth embodiments are identical to those of the first embodiment shown in FIG. 1, and hence have not been described in detail.

FIG. 15 shows a vibration isolator according to a fifth embodiment of the present invention. The vibration isolator of the fifth embodiment includes a base plate 73, a tubular body 72 having a lower end fixed to the base plate 73, an annular resilient body 71 having an outer peripheral surface secured to an upper end of the tubular body 72, and an attachment member 70 having an outer peripheral surface secured to an inner peripheral surface of the annular resilient body 71. The base plate 73, the tubular body 72, the annular resilient body 71, and the attachment member 70 jointly define a first chamber $S_1$ above the base plate 73. A diaphragm 78 attached to a lower surface of the base plate 73 has its outer peripheral edge clamped to the base plate 73 by an undercover 79 having a breathing hole 79a. The base plate 73 and the diaphragm 79 jointly define a second chamber $S_2$ therebetween. The base plate 73 has a central orifice 74 and a circular hole 75 in which a cylinder 81, identical to the cylinder 15 of the first embodiment, is fixedly mounted. A bellows 82 with a gas sealed therein is fixedly mounted on an upper surface of the base plate 73, with a thick disk-shaped weight 83 fixed to an upper end of the bellows 82. The base plate 73 also has a larger circular hole 76 covered with a thin film of rubber 84 sandwiched between upper and lower perforated plates 87, 88 with spacer rings 85, 86 interposed therebetween. The base plate 73 also has an annular hole 77 and supports thereon a check valve 94 having a thin circular plate 91 covering downwardly the annular hole 77 under the resilient force of a coil spring 93. The circular plate 91 has orifices 92 defined therethrough.

With the cylinder 81, the bellows 82 with the weight 84, the thin rubber film 84 and the check valve 94, the vibration isolator of FIG. 15 has the following advantages: While the engine is idling, the dynamic spring constant of the vibration isolator is reduced by resonance of the liquid in the cylinder to thereby reduce engine vibrations transmitted to the chassis, as with the first embodiment. When the engine produces vibrations at higher frequencies, liquid displacements can be taken up by elastic deformation of the thin rubber film 84 for thereby reducing high-frequency vibrations transmitted. The vertical movements of the thin rubber film 84 are limited by the upper and lower perforated plates 87, 88. When the engine shakes at frequencies ranging from 5 Hz to 30 Hz, the bellows 82 and the weight 83 resonate to provide increased damping for suppressing transmission of shaking vibrations to the chassis. The check valve 94 is effective to dampen large shocks produced by the engine.

With the construction of the embodiment of FIG. 15, therefore, the transmission of engine vibrations to the chassis can be reduced in idling and higher frequency ranges, and also chassis vibrations can be suppressed in the frequency range of shaking engine vibrations. The vibration isolator of FIG. 15 is also capable of dampening large engine shocks.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A vibration isolator for mounting a vibrating body on a structural body, comprising:
   (a) a first attachment member to be connected to the vibrating body;
   (b) a second attachment member to be connected to the structural body;
   (c) an elastically deformable resilient member fixed to and interconnecting said first and second attachment members, said resilient member being elastically deformable in response to relative movement of said first attachment member with respect to said second attachment member;
   (d) first chamber defined at least partly by said resilient member and having a volume variable dependent on elastic deformation of said resilient member;
   (e) a second chamber communicating with said first chamber through a communication structure and having a volume variable dependent on variations of the volume of said first chamber, said first and second chambers being filled with a liquid;
   (f) said communication structure including a weighted reed valve and a passage means, said passage means having an internal volume which allows substantial resonance of a flow of the liquid in said passage means to be induced by vibrations of the vibrating body based on both the mass of said liquid flowing in said passage means and the difference between pressures in said first and second chambers; and
   (g) said weighted reed valve disposed between said first and second chambers and resonatable in response to a variation in the difference between pressures in said first and second chambers, said resonance of said weighted reed valve not coinciding with the resonance of flow of the liquid in said passage means, wherein said vibrating body is an engine and said internal volume of said passage means is predetermined so as to cause resonance of the fluid when the engine is idling.

2. A vibration isolator according to claim 1, wherein said passage means comprises a straight passage defined in a rigid pipe.

3. A vibration isolator according to claim 2, wherein said rigid pipe has a substantially tapered and flaring toward a tip thereof.

4. A vibration isolator according to claim 1, wherein said passage means comprises a bent passage defined in a rigid pipe.

5. A vibration isolator according to claim 1, wherein said passage means comprises a passage defined in a tube of a resilient material.

6. A vibration isolator according to claim 1, including a valve actuatable in response to the difference between pressure in said first and second chambers for reducing said difference.

7. A vibration isolator for mounting a vibration body on a structural body according to claim 1, wherein said communication structure has an elongated hole and said reed valve has a complementary shape to said elongated hole, said weight reed valve being mounted on said communication structure to substantially close said elongated hole with only a narrow clearance left between an edge of said elongated hole and said weighted reed valve.

8. A vibration isolator for mounting a vibration body on a structural body according to claim 1, wherein said communication structure has a circular hole and said reed valve being contained in a circular plate which has an oblong hole, wherein said circular plate is attached to said communication structure over said circular hole.

9. A vibration isolator for mounting a vibrating body on a structural body according to claim 1, wherein a weight is fixed to a free end of said weighted reed valve with said weight having a natural frequency of vibration which coincides with the harmonics of a natural vibration of said vibrating body.

10. A vibration isolator for mounting a vibrating body on a structural body according to claim 1, wherein said weighted reed valve is a plurality of reed valves having different resonant frequencies.

11. A vibration isolator for mounting a vibrating body on a structural body, comprising:
    (a) a first attachment member to be connected to the vibrating body;
    (b) a second attachment member to be connected to the structural body;

(c) an elastically deformable resilient member fixed to and interconnecting said first and second attachment members, said resilient member being elastically deformable in response to relative movement of said first attachment member with respect to said second attachment member;

(d) first chamber defined at least partly by said resilient member and having a volume variable dependent on elastic deformation of said resilient member;

(e) a second chamber communicating with said first chamber thorough a communication structure and having a volume variable dependent on variations of the volume of said first chamber, said first and second chambers being filled with a liquid;

(f) said communication structure including a valve and a passage means, said passage means having an internal volume which allows substantial resonance of a flow of the liquid in said passage means to be induced by vibrations of the vibrating body based on both the mass of said liquid flowing in said passage means and the difference between pressures in said first and second chambers; and (g) said valve actuable in response to the difference between pressures in said first and second chambers for reducing said difference wherein said internal volume of said passage means is predetermined to cause resonance of the fluid when the engine is idling.

12. A vibration isolator for mounting a vibrating body on a structural body according to claim 11, wherein said valve is a spring valve composed of a pair of leaf springs.

13. A vibration isolator for mounting a vibrating body on a structural body according to claim 11, wherein said communication structure has a rectangular hole and said valve is a spring valve composed of a pair of leaf springs, said leaf springs each in the form of a thin rectangular metal plate being fixed to opposite sides of said rectangular hole defining a slit between said leaf springs.

14. A vibration isolator for mounting a vibrating body on a structural body according to claim 13, wherein a large difference between liquid pressures in said first and second chambers displaces free ends of said leaf springs into a lower pressure chamber to increase the width of said slit, wherein a communication passage of an increased cross-sectional area is produced to reduce the liquid pressure in the higher pressure chamber.

15. A vibration isolator for mounting a vibrating body on a structural body according to claim 11, wherein said valve is a disk-shaped leaf spring having a diametrical slit with circular holes defined at opposite ends thereof.

16. A vibration isolator for mounting a vibrating body on a structural body according to claim 15, wherein said communication chamber has an opening and said disk-shaped leaf spring is fixedly positioned over said opening.

* * * * *